Nov. 30, 1954 L. E. BARTON 2,695,952
FREQUENCY MODULATION CONVERTER CIRCUIT
Filed Oct. 31, 1950 2 Sheets-Sheet 1

INVENTOR
Loy E. Barton
BY H. L. Newton
ATTORNEY

Nov. 30, 1954 L. E. BARTON 2,695,952

FREQUENCY MODULATION CONVERTER CIRCUIT

Filed Oct. 31, 1950 2 Sheets-Sheet 2

INVENTOR
Loy E. Barton
BY H. L. Mewston
ATTORNEY 2,695,952

FREQUENCY MODULATION CONVERTER CIRCUIT

Loy E. Barton, Princeton, N. J., assignor to Radio Corporation of America, a corporation of Delaware Application October 31, 1950, Serial No. 193,183

The terminal fifteen years of the term of the patent to be granted has been disclaimed 7 Claims. (Cl. 250—20)

This invention relates to means for receiving and demodulating frequency-modulated carrier waves. More particularly, this invention relates to means for converting the frequency variations of a frequency modulated carrier wave into corresponding amplitude or intensity variations of an electric current or potential.

In the past it has been general practice to utilize superheterodyne receiving systems for the reception of frequency-modulated carrier waves. These receiving systems frequently utilized limiter stages to prevent noise arising due to amplitude modulation, and a discriminator network to convert the frequency variations into corresponding amplitude variations. Such stages and networks are quite expensive and require a relatively large number of components. Further, the discriminator networks and stages are difficult to adjust for proper reception. Accordingly, the receiving system proposed by this invention eliminates the necessity of these stages.

It has also been proposed to utilize super-regenerative receiving systems, which operate to provide an intermediate-frequency carrier wave having a center frequency which is located on the slope of the frequency response characteristic of the intermediate-frequency amplifier circuits. However, this type of receiving system requires all of the expensive and critical stages of the above-described receiving system.

Another circuit which has been devised to aid in the detection of frequency-modulated carrier waves includes the use of a pair of coupled resonant circuits tuned to the same frequency and connected respectively to two grids of a multi-grid tube. A variable frequency intermediate-frequency wave, when impressed upon the tuned circuits, produced a proportional variable phase between the voltages impressed upon the two grids, and as each of the grids is effective to control the tube current, the resulting current is proportional to the relative phase and magnitude of the impressed voltages. Thus, the amplitude variations in tube current are representative of the frequency variations of the impressed wave.

There has also been proposed a demodulator circuit having a distinct oscillator circuit for developing an oscillatory voltage equal to the mean frequency of the intermediate-frequency of the system. Thus oscillatory voltage is applied to one grid of a multi-grid electron tube. The frequency-modulated carrier wave is independently applied to another grid of the electron tube. The resulting internal operation of the tube is much the same as above discussed, that is, the phase and amplitude relations of the grid voltages combine to produce an electron tube current amplitude modulated in accordance with the frequency variation of the applied wave.

However, for successful operation each of the last two described circuits require separate heterodyning circuits, conventional intermediate-frequency amplifier circuits, and limiter circuits. The present invention is directed to overcome the necessity of such requirements and still maintain the quality of frequency-modulation carrier wave reception.

Accordingly, it is an object of this invention to provide a simple means for receiving and converting a frequency-modulated carrier wave into an equivalent amplitude-modulated intermediate-frequency carrier wave.

Another object of this invention is to provide an inexpensive receiving system for frequency-modulated carrier waves having a minimum of tuned circuits.

A still further object of this invention is to provide a new and novel receiving system capable of converting frequency variations into corresponding amplitude variation of current or potential.

The above and further objects of this invention will become more apparent from the following detailed description when read with reference to the accompanying drawings in which like reference characters are used for like parts throughout.

In accordance with the present invention there is provided a signal receiving system including a converter stage having an output which approaches the characteristic of a resonant curve without the usual associated elements of a resonant circuit. Further, this system utilizes resistance-coupled intermediate-frequency amplifier stages and a simple amplitude-modulation detector stage.

Figure 1:
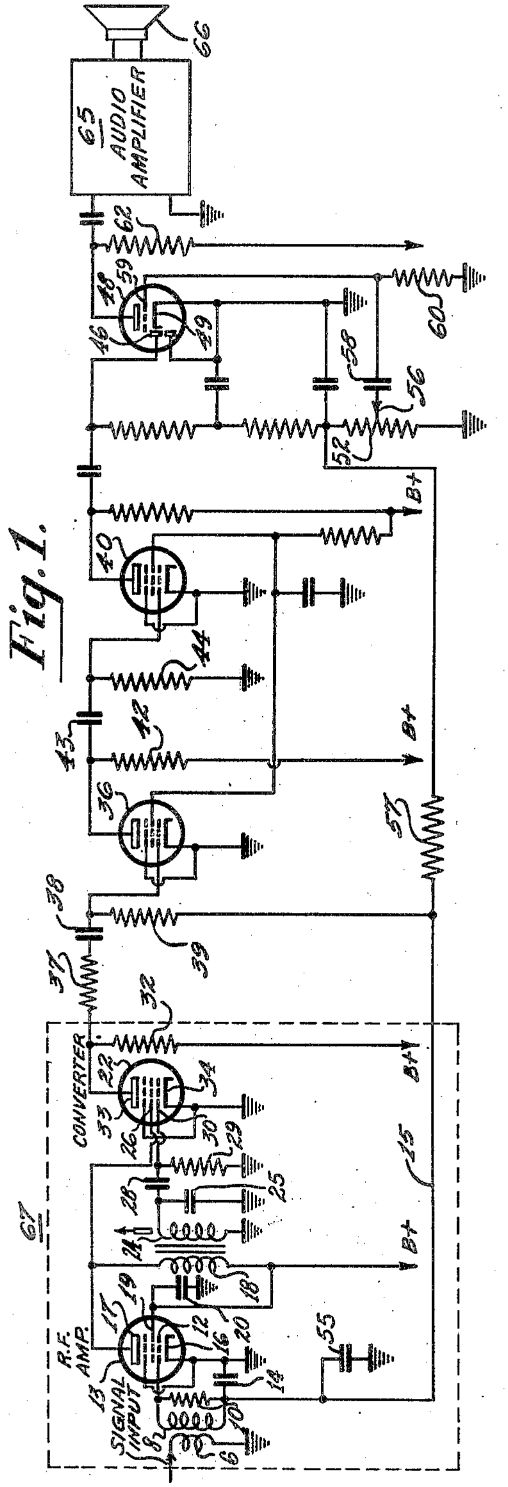
Figure 1 is a schematic circuit diagram of a frequency modulation carrier wave receiving system provided in accordance with the invention.

Referring to Figure 1, an input circuit 6, which may be a portion of an antenna circuit or the output circuit of a previous radio-frequency amplifier, is inductively coupled to the input inductor 8 of a radio-frequency amplifier tube 13. The inductor 8 is tuned by distributed capacity to approximately 100 megacycles and is connected in shunt with a resistor 10, which broadens the frequency response characteristic of the tuned circuit so as to make the circuit responsive to a frequency range of approximately 88 to 108 megacycles, which is the present frequency-modulation broadcast band. One end of the resistor 10 is connected to the control grid 12 of the radio-frequency amplifier tube 13. The other end of the resistor 10 is connected to ground through a radio frequency bypass capacitor 14 and is also connected to an automatic volume control bus 15 for providing automatic volume control potentials developed in accordance with the signal level. In order to complete the input circuit of the radio-frequency amplifier tube 13, the cathode 16 is connected directly to ground.

An inductor 18 is connected between the anode 17 of the radio-frequency amplifier tube 13 and the positive terminal B+ of a source of direct current energizing potential (not shown) which would be normally connected with the negative terminal connected to ground. Amplified carrier-wave voltages from the radio-frequency amplifier tube 13 are developed across the inductor 18 which also comprises a portion of the local oscillator tank circuit as will be discussed more fully in connection with Figure 2. The screen grid 19 of the radio-frequency amplifier tube 13 is connected directly to B+ and is bypassed to ground for radio frequency currents by means of a capacitor 20 to provide a low impedance return path for these currents.

A converter tube 22, which is illustrated as a pentode but for the purpose of the invention may be any multi-element electron tube having at least two grids, is utilized as a combined mixer and local oscillator stage. The operation of this circuit will be described in more detail in connection with Figure 2 of the drawings. The input circuit for the control grid 30 of the converter tube 22 comprises a tuned circuit composed of a core tuned inductor 24 and a capacitor 25 which form a parallel resonant circuit tuned to a frequency which differs from the frequency of the radio frequency carrier wave by a frequency difference in the order of 500 kilocycles or less to provide the desired intermediate frequency.

The combination of the tunable inductor 24 and the closely coupled fixed inductor 18 provides the necessary circuits for the local oscillator portion of the converter tube 22.

A direct connection between the anode end of the inductor 18 and the screen grid 26 of the converter tube 22 comprises one terminal of the radio-frequency carrier wave input circuit to the converter stage, the other terminal being ground. A capacitor 28 and a grid leak resistor 29 are connected to the control grid 30 of the converter tube 22 to provide proper operating bias for oscillation. An anode load resistor 32 is connected between the anode 33 of the converter tube 22 and B+.

The cathode 34 of the converter tube 22 is connected to ground to complete the radio-frequency carrier wave input circuit and the direct current path for the converter tube 22. It is noted at this time that the values of capacitors 25 and 28, resistor 29 and the feed-back inductor 18 are determinative of the converter stage response characteristics. However, this will be more fully described in connection with Figures 3 through 5. However, it is to be noted at this time, that the output of the converter stage is a variable frequency intermediate-frequency carrier wave which is amplitude modulated in accordance with the frequency modulations of the received radio-frequency carrier wave.

The intermediate-frequency amplifier stages of the receiving system comprises resistance-coupled amplifier tubes 36 and 40 and are well known in the art. Therefore, a minimum of discussion concerning their operation will be considered sufficient.

The first intermediate-frequency amplifier tube 36, is resistance coupled by means of a resistor 37, a coupling capacitor 38 and grid leak resistor 39 to the output of the frequency converter tube 22. The output of the first intermediate frequency amplifier tube 36 is resistance coupled to the input of the second intermediate-frequency amplifier tube 40 by means of an anode load resistor 42, a coupling capacitor 43 and grid leak resistor 44. The output of the second intermediate-frequency amplifier tube 40 is coupled to the diode detector section of a conventional duo-diode-triode electron tube, which is utilized as an amplitude modulation detector and the first audio amplifier stage.

The diode anode 46 of the detection-audio amplifier tube 48 in conjunction with the cathode 49 serves as a rectifier or detector to develop the modulation component of the intermediate frequency carrier wave and also to provide an automatic volume control potential in accordance with carrier wave level. The modulation component potential is developed across resistor 52, which is connected to ground at one end and connected through resistor 57 to a grid resistor 39 of the first intermediate frequency amplifier tube 36, and to one end of the grid resistor 10 of the radio frequency amplifier tube 13. Resistor 57, in combination with capacitor 55 provide the usual filter for the automatic volume control potential.

A variable tap 56 on resistor 52 serves as a variable volume control and is connected by means of a coupling capacitor 58 to the control grid 59 of the triode audio amplifier section of the detector-audio amplifier tube 48. The grid circuit of audio amplifier section is completed to ground by a grid resistor 60.

An anode load resistor 62 is connected between the anode 63 of the detector-audio amplifier tube 48 and B+. Signal voltages developed across the anode load resistor 62 may be applied to additional audio amplification stages as indicated by the rectangle 65, which can be used to amplify the audio signal and supply sufficient power to operate a transducer device such as shown by the speaker 66.

Figure 2:
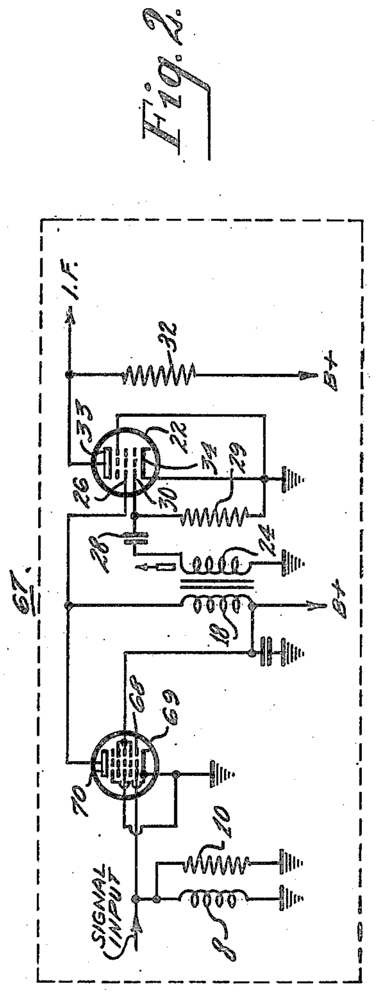
Figure 2 is a schematic circuit diagram of a portion of the receiving system of Figure 1 and showing another embodiment of the invention.

With reference now to Figure 2, there is shown a schematic circuit diagram of a second embodiment of the invention representing a modification of that portion of Figure 1 which is included within the dotted rectangle 67.

The radio-frequency carrier wave is shown as being connected directly to the control grid 68 of the radio frequency amplifier tube 69 which is illustrated as a pentagrid type of electron tube. It is, of course, to be understood that the input radio-frequency carrier wave can be derived directly from an antenna or from the output of a previous radio-frequency carrier wave amplifier stage. As discussed above in connection with Figure 1, the input inductor 8 is tuned by distributed capacity to approximately 100 megacycles and is shunted by a resistor 10 to provide a broad signal response characteristic.

The output circuit of the radio-frequency amplifier 69 comprises the closely coupled inductors 18 and 24 of the oscillator circuit, inductor 18 being connected between the anode 70 of electron tube 69 and B+.

Local oscillations for mixing and frequency conversion of the radio-frequency carrier wave are supplied by the local oscillator portion of the converter tube 22 comprising a cathode 34, a control grid 30 and a screen grid 26 of the converter tube 22. A tuned circuit including inductor 24 and its distributed capacity, resonant at a frequency above or below the input radio-frequency carrier wave center frequency by an amount equal to the desired intermediate frequency, is coupled to the control grid 30 of the converter tube 22 by a capacitor 28. The grid leak resistor 29 is connected between the control grid 30 and ground and operates in conjunction with the capacitor 28 to provide proper bias for the converter tube 22. The output of the converter stage is derived across the anode load resistor 32 which is coupled between the anode 33 of the converter tube 22 and B+. The output signal is in the form of an amplitude modulated varying intermediate-frequency signal.

Figure 3:
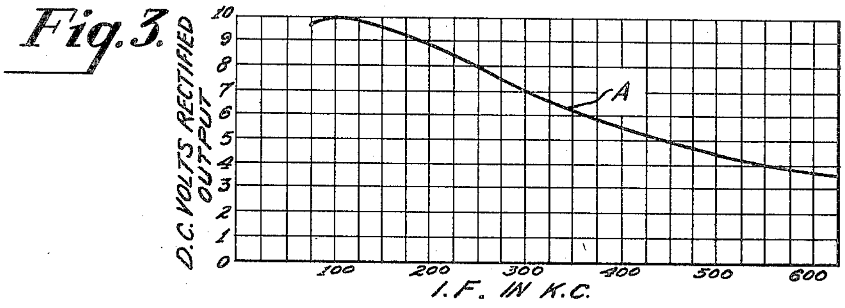
Figure 3 is a graph showing a curve representing the relation between the rectified output voltage of the intermediate-frequency amplifier stages and the frequency deviation of an impressed intermediate-frequency carrier wave which is obtainable by proper design of the resistor-capacitor coupling networks.

The curve A shown in Figure 3 is illustrative of a response characteristic which can be obtained by resistor-capacitor coupling network design in the intermediate-frequency amplifiers 36 and 40 to cooperate with the converter stage characteristics in obtaining distortionless conversion from a frequency-modulated wave to an amplitude-modulated carrier wave of a different frequency. However, it is also to be understood that intermediate-frequency amplifiers having a flat response over the frequency deviation of the intermediate-frequency carrier wave will provide an output comparable to present frequency-modulation carrier wave receiving systems with a proper selection of the oscillator circuit constants.

Extensive tests have been performed on a circuit constructed in accordance with the invention and the results obtained were as will now be discussed.

Because of the low intermediate frequencies utilized in accordance with the invention 100 kilocycles to 500 kilocycles, the coupled circuit provided by inductors 18 and 24 offers near maximum impedance at the frequency of the input radio-frequency carrier wave. The anode circuit of radio-frequency amplifier tube 69 is therefore essentially tuned to the radio-frequency input wave.

Figure 4:
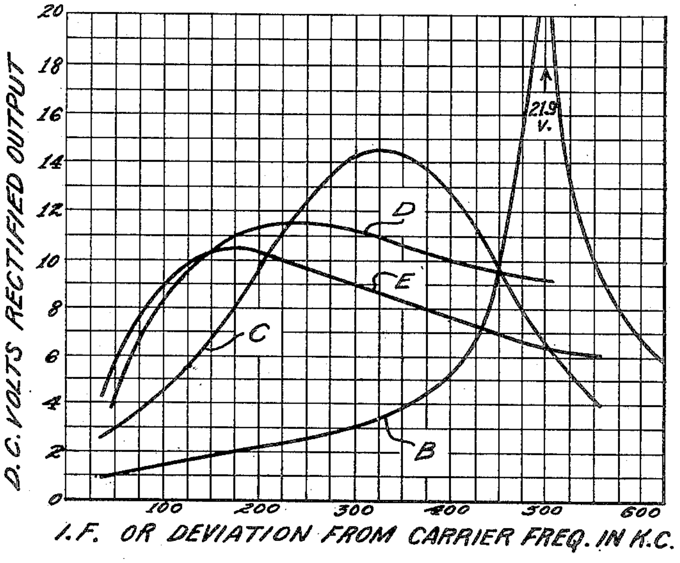
Figure 4 is a graph showing curves representing the relation between the rectified output voltage of the embodiment shown in Figure 2 and the frequency deviation of an impressed carrier wave from the local oscillator frequency when the value of the circuit elements of the oscillator circuit are changed.

The converter stage has a frequency discriminator characteristic similar to that of a tuned circuit. The frequency peak of the intermediate-frequency carrier wave output can be altered by changing the values of the grid leak resistor 29 and the capacitor 28 as is shown by the curves illustrated in Figure 4. The various curves illustrated by the graph of Figure 4 show the modification of the converter response characteristic for various values of capacitor 28 and resistor 29. Curve B shows the converter response to a variable radio-frequency carrier wave when the capacitor 28 is of a value of 15 micro-microfarads and resistor 29 is of a value of 0.8 megohm. Curves C, D and E are shown for various increasing values of capacitor 28 and resistor 29. It should be noted that a circuit having the response characteristic as illustrated by curve E has been tested with excellent results.

Figure 5:
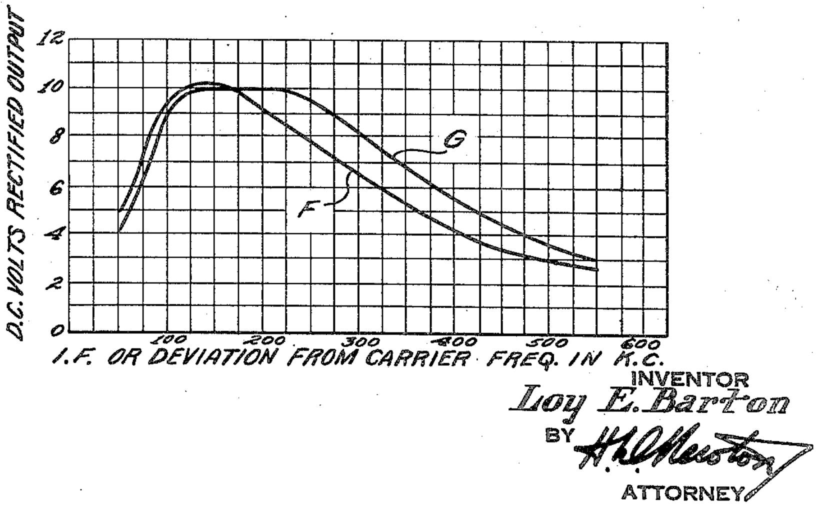
Figure 5 is a graph showing curves representing the relation between the rectified output voltage of the receiver illustrated in Figure 1 and the frequency deviation of an impressed carrier wave from the fixed local oscillator frequency.

Figure 5 is a graph showing two curves illustrating the overall response of the converter stage and the intermediate frequency amplifiers when two of the conditions shown in Figure 4 exist. Curve F provides the most desirable result with the oscillator tuned to about 280 kilocycles away from said frequency of the received radio-frequency carrier wave. This provides for a minimum of distortion in the detector stage. Curve G represents a response characteristic which may be desirable if certain noise reducing circuits are incorporated in the receiving system.

In general it has been found that oscillator parameters which include all circuit elements and their values between the anode of the radio-frequency amplifier tube 13 and the converter tube 22 effect the converter response. Oscillator parameters which permit easy phase shift between the two oscillator inductors 18 and 24 at the radio-frequency carrier wave frequency as the carrier wave frequency deviates from the oscillator frequency, result in higher intermediate-frequency response at lower frequencies. If the phase shifts slowly, the peak intermediate-frequency response occurs at higher frequencies and is usually sharp as shown by the curve B of Figure 4.

There is, therefore, provided a converter tube having an oscillator section operating to furnish a fixed frequency local oscillator wave for any given dial setting, and having impressed on the screen grid a varying frequency radio-frequency carrier wave which serves to amplitude modulate the output of the converter tube in accordance with the impressed frequency variations to provide in the output of the electron tube an amplitude-modulated carrier wave of varying intermediate or difference frequency.

It should be remembered that generally the intermediate-frequency output characteristic of a converter stage is essentially flat with respect to frequency. It should, also be remembered that the total frequency excursion of a frequency-modulated carrier wave is in the order of 150 kilocycles. Therefore, in order to provide sufficient adjacent channel rejection with the Q obtainable by conventional circuits, the usual intermediate-frequency utilized in frequency-modulated carrier wave receivers is in the order of 10 megacycles. In the case of the above described circuit, the intermediate frequency response above 500 kilocycles is very low. It is, therefore, readily seen that the above described system is adapted for resistance-coupled intermediate-frequency amplifiers as the intermediate-frequency of the system is in the range of only 1 to 3 times the maximum frequency excursion of the carrier wave, which is the modulation signal.

This amplitude-modulated intermediate-frequency carrier wave is amplified by means of resistance-capacity coupled intermediate-frequency amplifiers and detected by means of a conventional amplitude-modulation detector to obtain the modulation component.

There has thus been described a simple, inexpensive, frequency-modulated carrier wave receiver having all of the benefits of frequency modulation transmission without the usual critical complicated and expensive components.

What I claim is:

1. In a system for receiving frequency-modulated carrier wave energy, means for amplifying the received modulated carrier wave energy and having an input circuit and an output circuit, means including a converter stage comprising a mixer and an oscillator, said oscillator having an anode circuit directly connected to said amplifying means output circuit and a grid circuit inductively coupled to said amplifying means output circuit, a converter stage output circuit for deriving a variable intermediate-frequency wave amplitude-modulated in accordance with the frequency variations of the modulated carrier wave, resistance-coupled amplifier means coupled to said converter stage output circuit for amplifying said amplitude-modulated intermediate-frequency wave, and means coupled to said intermediate-frequency amplifying means for detecting and reproducing amplitude-modulations.

2. In a system for receiving frequency-modulated carrier wave energy, means for amplifying the received modulated carrier wave energy and having an input circuit and an output circuit including a single inductor, means including a converter stage comprising a mixer and an oscillator having a tank circuit closely coupled to said single inductor, means connecting said single inductor with said oscillator to provide a feedback means therefor a direct connection between said amplifying means output circuit and said mixer, and a converter stage resistive output circuit for deriving an intermediate-frequency wave of variable frequency amplitude-modulated in accordance with the frequency variation of the modulated carrier wave, resistance coupled amplifier means coupled to said converter stage output ciircuit for amplifying said amplitude-modulated intermediate-frequency wave, and means coupled to said intermediate-frequency amplifying means for detecting and reproducing said amplitude-modulations.

3. In a system for receiving and demodulating a frequency-modulated radio-frequency carrier wave, a converter stage comprising; a signal input circuit for said converter, a source of frequency-modulation radio-frequency carrier waves directly connected to said input circuit, an oscillator circuit including an inductor connected with said input circuit, a parallel resonant crcuit for said oscillator inductively coupled with said inductor, and a substantially purely resistive converter output circuit coupled to said oscillator circuit for deriving an intermediate-frequency wave amplitude-modulated in accordance with the frequency modulation of said carrier wave.

4. In a system for receiving and demodulating a frequency-modulated radio-frequency carrier wave, a radio-frequency carrier wave amplifier having an input circuit and an anode, a single inductor connected to said anode, a converter stage having a first grid and a second grid and comprising an oscillator circuit including a parallel resonant grid circuit connected to said first grid and closely coupled with said inductor, a direct connection between said second grid and said anode, and a substantially purely resistive converter anode circuit coupled to said oscillator circuit for deriving an intermediate-frequency wave of varying frequency and amplitude modulated in accordance with the frequency variations of said modulated carrier wave.

5. In a system for receiving frequency-modulated carrier wave energy, a radio-frequency amplifying stage having an input circuit and an output circuit, a converter stage comprising an electron tube having a cathode, a control grid, a screen grid and an anode, said cathode being connected to a point of fixed reference potential, a capacitor and a parallel resonant tuned circuit connected in series arrangement between said control grid and said point of fixed reference potential, a grid resistor connected between said control grid and said point of fixed reference potential, an inductor connected between said screen grid and the positive terminal of a source of direct-current energizing potential and being inductively coupled with said tuned circuit, said screen grid being directly connected to said amplifying stage output circuit, and an anode impedance connected between said anode and said positive terminal of said source of direct current energizing potential, whereby there is developed across said anode load impedance an intermediate-frequency signal amplitude-modulated in accordance with the frequency variations of said carrier wave signal.

6. In a system for receiving a frequency-modulated radio-frequency carrier wave, a converter stage comprising an electron tube having a cathode, a control grid, a screen grid and an anode, a capacitor and a parallel resonant tuned circuit connected in series arrangement between said control grid and a point of fixed reference potential, a grid resistor connected between said control grid and said point of fixed reference potential, said cathode being connected to said point of fixed reference potential, an inductor connected between said screen grid and the positive terminal of a source of direct-current energizing potential and being inductively coupled with said tuned circuit, said inductor comprising the radio frequency carrier wave input circuit for said converter stage, and an anode load resistor connected between said anode and said positive terminal of said source of direct-current energizing potential, whereby there is developed across said anode load resistor an intermediate-frequency signal amplitude-modulated in accordance with the frequency variations of said received carrier wave signal.

7. In a system for receiving and demodulating a frequency-modulated radio frequency carrier wave, a radio-frequency amplifier circuit comprising an electron tube having an anode, a control grid and a cathode, a fixed, broadly tuned resonant input circuit connected between said control grid and a point of fixed reference potential, an inductor connected between said anode and the positive terminal of a source of direct current energizing potential; a converter stage for converting said frequency modulated radio frequency carrier wave signal to an amplitude modulated relatively low intermediate frequency signal and comprising an electron tube having an anode, a screen grid, an oscillator control grid and a cathode, said cathode being connected to said point of fixed reference potential, a tunable parallel resonant tuned circuit closely coupled to said inductor resonant at a frequency different from said input circuit by an amount equal to the desired intermediate frequency, one terminal of said parallel resonant circuit being connected to said point of fixed reference potential, a capacitor connected between the other terminal of said parallel resonant circuit and said oscillator control grid, a resistor connected between said oscillator control grid and said point of fixed reference potential, a direct connection between said radio frequency amplifier anode and said screen grid, and an anode load resistor connected between said converter stage anode and said positive terminal of said source of direct-current energizing potential, whereby there is developed across said anode load resistor an intermediate frequency signal amplitude modulated in accordance with the frequency variations of said received radio frequency carrier wave signal.

References Cited in the file of this patent

UNITED STATES PATENTS

| Number | Name | Date |
|---|---|---|
| 2,124,189 | Dow | July 19, 1938 |
| 2,241,569 | Zakarias | May 13, 1941 |
| 2,255,668 | Koch | Sept. 9, 1941 |
| 2,302,867 | Hunt | Nov. 24, 1942 |

FOREIGN PATENTS

| Number | Country | Date |
|---|---|---|
| 720,342 | France | Dec. 3, 1931 |